United States Patent [19]

Otsuki et al.

[11] 3,894,041
[45] July 8, 1975

[54] PROCESS FOR PREPARING N-ETHYLOL CARBAZOLE

[75] Inventors: Hiroshi Otsuki, Tokyo; Kenzo Sakuma, Kanagawa; Isamu Matsuzawa, Tokyo, all of Japan

[73] Assignee: Takasago Perfumery Co., Ltd., Tokyo, Japan

[22] Filed: Oct. 26, 1973

[21] Appl. No.: 410,152

[30] Foreign Application Priority Data
  Oct. 30, 1972  Japan.............................. 47-107941

[52] U.S. Cl............ 260/315; 260/88.3 R; 96/1 PC; 96/1.5
[51] Int. Cl............................................ C07d 27/68
[58] Field of Search .................................... 260/315

[56] References Cited
  FOREIGN PATENTS OR APPLICATIONS
  170,858  11/1945  Japan
  170,863  11/1945  Japan

OTHER PUBLICATIONS

C.A. 60: 15,837 c, (1964) Lopatinskii et al.
Epoxides & Their Derivatives, Malinouskii (1965) pages 141–142.

*Primary Examiner*—Henry R. Jiles
*Assistant Examiner*—S. D. Winters
*Attorney, Agent, or Firm*—Sughrue, Rothwell, Mion, Zinn & Macpeak

[57] ABSTRACT

A process for preparing N-ethylol carbazole by reacting an alkali metal salt of carbazole with ethylene oxide in an aliphatic or an aromatic hydrocarbon in the presence of a carbonyl compound, and then decomposing the reaction product with water.

The N-ethylol carbazole can be converted to N-vinyl carbazole by dehydration, which is useful as a material for preparing poly(vinyl carbazole).

10 Claims, No Drawings

PROCESS FOR PREPARING N-ETHYLOL CARBAZOLE

BACKGROUND OF THE INVENTION

1. Field of the Invention

This invention relates to a process for preparing N-ethylol carbazole which is useful in preparing N-vinyl carbazole, a monomer material employed to produce poly(vinyl carbazole).

Since N-ethylol carbazole can be converted to N-vinyl carbazole by dehydration, N-ethylol carbazole is important as a material for the production of poly(vinyl carbazole). Since the poly(vinyl carbazole) prepared using N-ethylol carbazole to prepare the monomer employed is especially superior, in terms of its photoconductivity, as a material for use in modern electrophotography, the establishment of a commercial process for producing N-ethylol carbazole has become important.

2. Description of the prior Art

Previously, known methods for producing N-ethylol carbazole include, for example, a method comprising reacting an alkali metal salt of carbazole with ethylene oxide, as disclosed in Japanese Pat. Nos. 170,858 and 170,863. However, according to these methods, the reaction of the carbazole alkali metal salt with ethylene oxide does not proceed smoothly, but rather begins abruptly, and thus the reaction can be dangerous.

Furthermore, large amounts of by-products are formed, and N-ethylol carbazole in high purity cannot be obtained unless the reaction mixture is filtered and then decomposed with water.

When the potassium salt of carbazole is suspended, for example, in xylene and ethylene oxide is bubbled into the suspension, ethylene oxide merely dissolves initially, and an addition reaction does not occur readily. After the ethylene oxide has been absorbed in a considerable amount, a reaction abruptly occurs, and the solvent boils and is expelled violently. This reaction, therefore, is very dangerous.

It is an object of this invention to provide a process for preparing N-ethylol carbazole, which can be operated safely and easily in plants.

Another object of this invention is to provide a process for preparing N-ethylol carbazole useful for producing vinyl carbazole of high purity suitable for use in electrophotography.

SUMMARY OF THE INVENTION

We have made various investigations on performing this reaction smoothly while controlling it easily and reducing sidereaction. As a result, it has been found that when the reaction is performed in the presence of a small amount of a carbonyl compound such as ketones, e.g., acetone, methyl ethyl ketone, acetophenone, or cyclohexanone or aldehydes e.g., butyraldehyde, or benzaldehyde, the above danger is completely obviated, and the ethylene oxide reacts with the potassium salt of carbazole as soon as it is introduced into the reaction system.

The product formed is of high purity and is yellowish brown in color while the reaction products obtained using conventional methods are dark black and are of low purity. Also, since the amount of the unreacted potassium salt of carbazole is small it is not necessary to filter the reaction product mixture before decomposition of the reaction product with water.

According to this invention, there is provided a process for preparing N-ethylol carbazole, which comprises reacting an alkali metal salt of carbazole (e.g., the sodium or potassium salt) with ethylene oxide in an aliphatic or aromatic hydrocarbon medium in the presence of a carbonyl compound, and then decomposing the reaction product with water.

DETAILED DESCRIPTION OF THE INVENTION

Examples of suitable carbonyl compounds which can be used in this invention are aliphatic, aromatic and alicyclic carbonyl compounds, such as ketones, e.g., acetone, methyl ethyl ketone, acetophenone or cyclohexanone or aldehydes, e.g., propionaldehyde, butyraldehyde or benzaldehyde. Ketone compounds are especially preferred. The amount of the carbonyl compound is suitably 0.1 to 1 mol, especially 0.2 to 0.5 mol, based on the moles of the alkali metal salt of carbazole.

The reaction conditions used can be those employed in the known methods for producing N-ethylol carbazole by reacting a carbazole alkali metal salt with ethylene oxide. Specifically, a carbazole alkali metal salt is suspended in an aliphatic or aromatic hydrocarbon, such as benzene, toluene or xylene with xylene being particularly prefered in an amount of solvent of about 1.8 to 2.5 times, preferably about 2 times, by weight to the weight of the alkali metal carbazole salt and the above described carbonyl compound is added, followed by direct bubbling of ethylene oxide into the suspension or by dropwise addition of a solution of ethylene oxide in the same solvent as described above, such as toluene or xylene, to the suspension with stirring.

At this time, the reaction system is maintained at about 45° to 60°C, preferably about 50°C, by cooling with water or ice.

Using these conditions, the reaction proceeds very smoothly upon the addition of the ethylene oxide, and the reaction is not dangerous. The reaction is completed about 30 minutes after the addition of the ethylene oxide. According to the process of this invention, the amounts of the unreacted carbazole alkali metal salt and the by-products are markedly reduced. Therefore, the reaction product mixture does not have to be filtered, and water can be added to the mixture as such (e.g., at room temperature and in an amount about equivalent to the amount of solvent used) to decompose the alcoholate. The decomposition product is washed well with water until the alkali metal hydroxide is removed, and then distilled whereby the solvent is first recovered and then a fraction having a boiling point of about 235°C. at 10 mmHg is collected to afford high purity N-ethylol carbazole.

The N-ethylol is useful to prepare vinyl carbazole for use in electrophotography and such conversion can be by the method disclosed by R. G. Flowers et al in J.Am. Chem. Soc., 70, 3019 (1948). The following Examples illustrate the present invention more specifically. Unless otherwise indicated, all parts and percents are by weight.

EXAMPLE 1

A 2-liter four-necked flask was charged with 205 g (1 mol) of carbazole potassium salt powder and 500 ml. of xylene, and 12 g of acetone (about 0.2 mol) were further added. With stirring, 1.1 moles of ethylene oxide was bubbled into the mixture for 1 hour. The flask was cooled externally with water so as to maintain the reaction mixture at about 50°C. After the reaction, the reaction mixture was stirred for 30 minutes at 50°C. and 500 ml. of water was added, followed by stirring for a while.

All of the reaction liquor was transferred to a 5-liter fractionating funnel, and the lower aqueous layer was separated.

Then, the upper oily layer was washed several times with water until the water in the lower water layer became substantially neutral when determined by a litmus paper. The oily layer so obtained was distilled. First, the xylene was recovered, and then at reduced pressure a fraction having a boiling point of 200° to 210°C./2 mmHg was collected to afford 190 g (yield 90%) of N-ethylol carbazole.

EXAMPLE 2

The procedure of Example 1 was repeated except that 11.6 g (0.2 mol) of propionaldehyde was used instead of the acetone, to afford 180 g (yield 85%) of N-ethylol carbazole.

EXAMPLE 3

The procedure of Example 1 was repeated except that 20 g (0.2 mol) of cyclohexanone was used instead of the acetone, to afford 200 g (yield 95%) of N-ethylol carbazole.

While the invention has been described in detail and with reference to specific embodiments thereof, it will be apparent to one skilled in the art that various changes and modifications can be made therein without departing from the spirit and scope thereof.

What is claimed is:

1. A process for preparing N-ethylol carbazole, which consists essentially of reacting (1) a carbazole alkali metal salt with (2) ethylene oxide in (3) an aliphatic or an aromatic hydrocarbon in the presence of (4) a carbonyl compound, to obtain a reaction product containing N-ethylol carbazole and then decomposing the reaction product with water to obtain said N-ethylol carbazole.

2. The process of claim 1, wherein said carbonyl compound is an aliphatic, an aromatic or an alicyclic carbonyl compound.

3. The process of claim 2, wherein said carbonyl compound is a ketone.

4. The process of claim 2, wherein said carbonyl compound is selected from the group consisting of acetone, methyl ethyl ketone, propionaldehyde, butyraldehyde, benzaldehyde, acetophenone and cyclohexanone.

5. The process of claim 1, wherein the amount of said carbonyl compound is from 0.1 to 1 mol based on the total moles of the carbazole alkali metal salt.

6. The process of claim 1, wherein the amount of said carbonyl compound is from 0.2 to 0.5 mol based on total moles of the carbazole alkali metal salt.

7. The process of claim 1, wherein said decomposing directly follows said reacting.

8. The process of claim 1, where said decomposition product comprises an alkali metal hydroxide, which process further includes the steps of washing the decomposition product with water until alkali metal hydroxide is removed distilling the resulting material to remove solvent and then a fraction having a boiling point of about 235°C at 10 mmHg, whereby high purity N-ethylol carbazole is obtained.

9. The process of claim 5, wherein said aliphatic or aromatic hydrocarbon is selected from the group consisting of benzene, toluene and xylene.

10. The process of claim 1, wherein reaction is completed within about 30 minutes after the addition of ethylene oxide.

* * * * *